United States Patent
Yamada

(10) Patent No.: US 9,816,890 B2
(45) Date of Patent: Nov. 14, 2017

(54) PRESSURE SENSOR WITH PLASTICALLY DEFORMABLE CONNECTION

(71) Applicant: NAGANO KEIKI CO., LTD., Tokyo (JP)

(72) Inventor: Nobuaki Yamada, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 107 days.

(21) Appl. No.: 14/938,446

(22) Filed: Nov. 11, 2015

(65) Prior Publication Data

US 2016/0146691 A1 May 26, 2016

(30) Foreign Application Priority Data

Nov. 20, 2014 (JP) .................................. 2014-235835

(51) Int. Cl.
| | |
|---|---|
| *G01L 9/00* | (2006.01) |
| *G01L 19/14* | (2006.01) |
| *G01L 19/00* | (2006.01) |
| *F16L 29/02* | (2006.01) |

(52) U.S. Cl.
CPC .......... *G01L 19/147* (2013.01); *G01L 9/0041* (2013.01); *G01L 19/0015* (2013.01); *G01L 19/0038* (2013.01); *F16L 29/02* (2013.01)

(58) Field of Classification Search
None
See application file for complete search history.

(56) References Cited

U.S. PATENT DOCUMENTS

| | | | |
|---|---|---|---|
| 4,599,903 | A | 7/1986 | Ferris |
| 7,377,177 | B1 | 5/2008 | Lamb et al. |

(Continued)

FOREIGN PATENT DOCUMENTS

| | | |
|---|---|---|
| EP | 1 520 639 A1 | 4/2005 |
| EP | 2 199 771 A1 | 6/2010 |

(Continued)

OTHER PUBLICATIONS

European Search Report dated Apr. 14, 2016.
Japanese Office Action dated May 23, 2017, English translation included, 4 pages.

*Primary Examiner* — Andre Allen
(74) *Attorney, Agent, or Firm* — Rankin, Hill & Clark LLP

(57) ABSTRACT

A pressure sensor includes: a pressure sensor element; a metal adapter integrally attached to the pressure sensor element and defining therein a hole through which a pressure of a fluid to be measured is introduced to the pressure sensor element; a metal fitting member provided with a housing recess receiving the adapter and connectable to a connected member; and an operation member pressing a valve provided to the connected member and defining a communicating path through which a flow path, in which the pressure of the fluid to be measured is introduced, is in communication with the hole of the adapter. The adapter and the fitting member are connected to each other by plastic deformation. The operation member is a synthetic resin member including: a contact portion brought into contact with the adapter; and a pressing portion provided on a side opposite to the contact portion to press the valve.

3 Claims, 2 Drawing Sheets

(56) References Cited

U.S. PATENT DOCUMENTS

| | | | | |
|---|---|---|---|---|
| 2003/0151126 | A1* | 8/2003 | Scheurich | G01L 19/003 |
| | | | | 257/682 |
| 2017/0030786 | A1* | 2/2017 | Buck | G01L 9/008 |
| 2017/0030790 | A1* | 2/2017 | Buck | G01L 19/04 |
| 2017/0030793 | A1* | 2/2017 | Buck | G01L 19/04 |

FOREIGN PATENT DOCUMENTS

| | | |
|---|---|---|
| JP | H09-5196 | 1/1997 |
| JP | 2002-039901 | 2/2002 |
| JP | 2004-045253 | 2/2004 |
| JP | 2005-106467 | 4/2005 |
| JP | 2005-283253 | 10/2005 |
| JP | 4043874 | 11/2007 |

\* cited by examiner

PRESSURE SENSOR WITH PLASTICALLY DEFORMABLE CONNECTION

The entire disclosure of Japanese Patent Application No. 2014-235835 filed Nov. 20, 2014 is expressly incorporated by reference herein.

TECHNICAL FIELD

The present invention relates to a pressure sensor.

BACKGROUND ART

Some pressure sensors are configured to measure a pressure of a fluid to be measured flowing through an inside of a pipe. The pressure sensors include a pressure sensor including a joint connectable to a connected member of the pipe, the joint being provided with a pin for opening a valve of the connected member.

A typical example of this pressure sensor includes: a joint connectable to a connected member; a pressure sensor element welded to the joint; and an operation member provided to the joint, in which a valve provided in advance to the connected member is opened using the operation member in connecting the joint to the connected member (see, for instance, Patent Literature 1: Japanese Patent No. 4043874).

According to Patent Literature 1, the operation member is a pin, which includes a stepped cylindrical member and is welded to the joint.

Another typical example of the pressure sensor includes: a printed circuit board (PCB) including a substrate; a carrier provided to a first surface of the substrate; a pressure converting member provided to a second surface of the substrate; and a fitting provided with the substrate (see, for instance, Patent Literature 2: U.S. Pat. No. 7,377,177).

According to Patent Literature 2, the carrier, which is fitted to a valve (e.g., a Schrader valve), functions as a pin of Patent Literature 1, and is made of metal. The fitting functions as the joint of Patent Literature 1.

However, the pin (i.e., the operation member) of Patent Literature 1, which is welded to the joint along the entire circumference thereof, should be made of metal, and sealability between the pin and the joint welded to each other is ensured. The metal pin includes, for instance, a stainless-steel cylindrical member that is to be subjected to a process such as grinding. Such a troublesome process increases the production costs of the pin.

Patent Literature 2 also entails the same problems as those of Patent Literature 1 because the carrier, which corresponds to the pin of Patent Literature 1, is made of metal.

SUMMARY OF THE INVENTION

An object of the invention is to provide a pressure sensor including an easily manufacturable operation member.

According to an aspect of the invention, a pressure sensor includes: a pressure sensor element displaceable by a pressure of a fluid to be measured introduced through a connected member; a metal adapter integrally attached to the pressure sensor element, the adapter defining therein a hole through which the pressure of the fluid to be measured is introduced to the pressure sensor element; a metal fitting member provided with a housing recess for receiving the adapter, the fitting member being connectable to the connected member; and an operation member for pressing a valve provided to the connected member, the operation member defining a communicating path through which a flow path of the connected member, in which the pressure of the fluid to be measured is introduced, is in communication with the hole of the adapter, the operation member being a synthetic resin member including: a contact portion brought into contact with the adapter; and a pressing portion provided on a side opposite to the contact portion to press the valve, in which at least one of the adapter and the fitting member bites into the other one of the adapter and the fitting member to be airtightly attached with the other one of the adapter and the fitting member due to a plastic deformation of a surface of the one of the adapter and the fitting member facing the other one of the adapter and the fitting member in a direction orthogonal to an axial direction, a portion defined in a circumferential direction of the one of the adapter and the fitting member is locally plastically deformed to bite into the other one of the adapter and the fitting member with an elastic deformation pressure, and the elastic deformation pressure in the axial direction is trapped to maintain connection of the adapter and the fitting member in the axial direction.

In the above aspect, for instance, the fitting member and the adapter are connected by plastic deformation (metal flow) to be united, thereby preventing leakage of the fluid to be measured between these components.

In the above arrangement, the operation member is processed in a predetermined shape by, for instance, injection molding. Since the operation member is made of a synthetic resin, it can be easily processed. The operation member can thus be mass-produced to reduce the production costs thereof.

In the above aspect, it is preferable that the operation member includes: a flange brought into contact with the adapter; a pin body integral with the flange, the pin body having a distal end defined as the pressing portion for pressing the valve, the fitting member includes a joint that is to be screwed with the connected member, the joint is provided with an operation member fitting hole in which the operation member is to be fitted, the operation member fitting hole being continuous with the housing recess, and the operation member fitting hole includes: a large-diameter portion in which the flange is received; and a small-diameter portion through which the pin body penetrates, the small-diameter portion being continuous with the large-diameter portion.

In the above aspect, after the operation member is set in the operation member fitting hole, the adapter is received in the housing recess and connected to the fitting member by plastic deformation. The operation member, which is disposed between the fitting member and the adapter, can be easily positioned by connecting the fitting member and the adapter. Further, since the operation member fitting hole includes the large-diameter portion and the small-diameter portion, the operation member is prevented from coming out of the operation member fitting hole. Thus, the operation member does not need to be directly bonded to the fitting member by, for instance, welding, which results in facilitating an assembly process of the pressure sensor.

In the above aspect, it is preferable that the pressure sensor element is a metal member including: a diaphragm including a strain gauge; and a cylindrical portion in which the pressure of the fluid to be measured is introduced, the cylindrical portion being connected to an outer periphery of the diaphragm, the cylindrical portion having an open end welded to an end of the adapter.

In the above aspect, the pressure sensor element and the adapter, which are united by welding, can be easily attached to the fitting member.

The above aspect of the invention can provide a pressure sensor including an easily manufacturable operation member.

BRIEF DESCRIPTION OF DRAWING(S)

DESCRIPTION OF EMBODIMENT(S)

Exemplary embodiment(s) of the invention will be described below with reference to the attached drawings.

Figure 1:
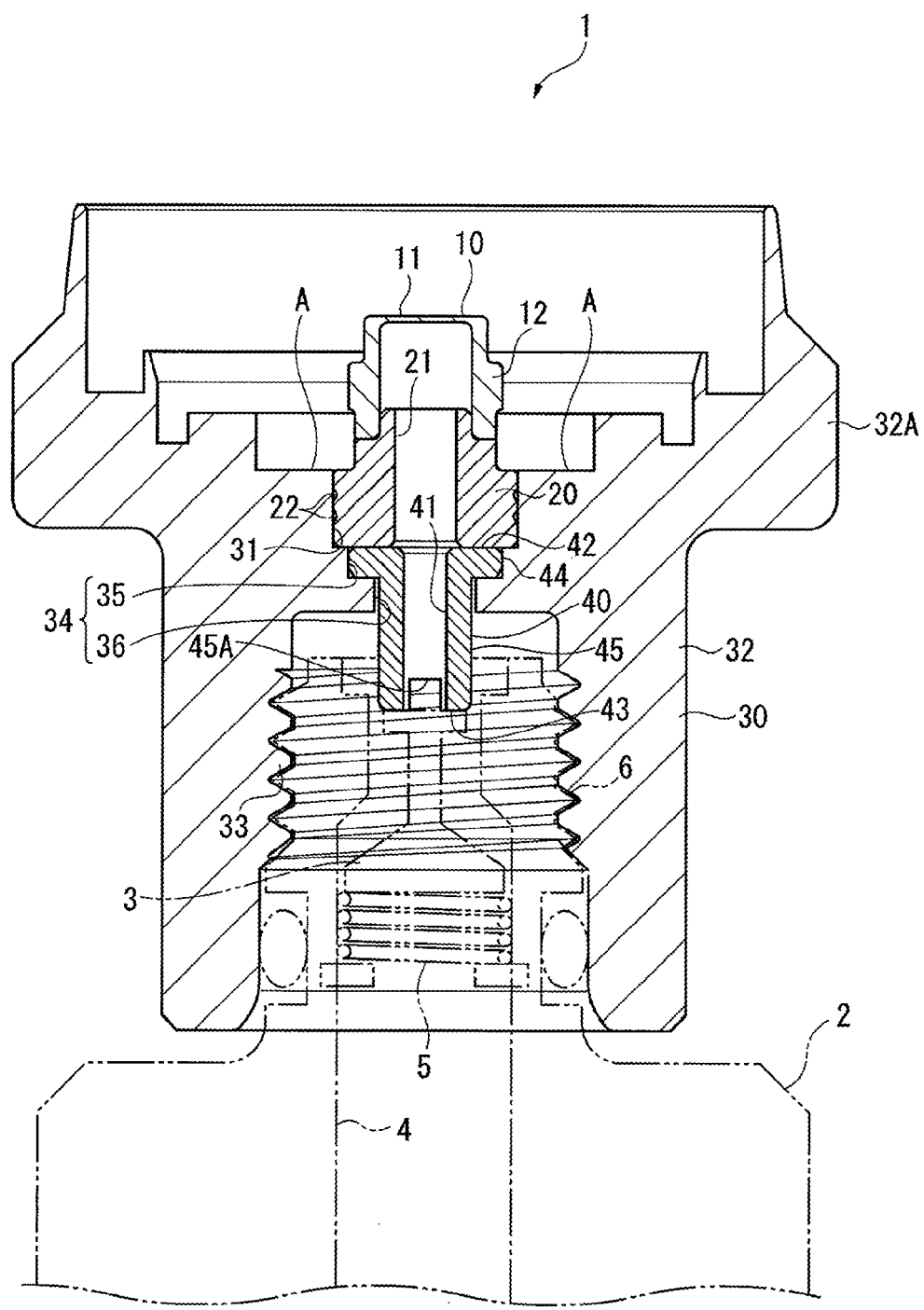
FIG. 1 is a sectional view showing a pressure sensor according to an exemplary embodiment of the invention.
Figure 2:
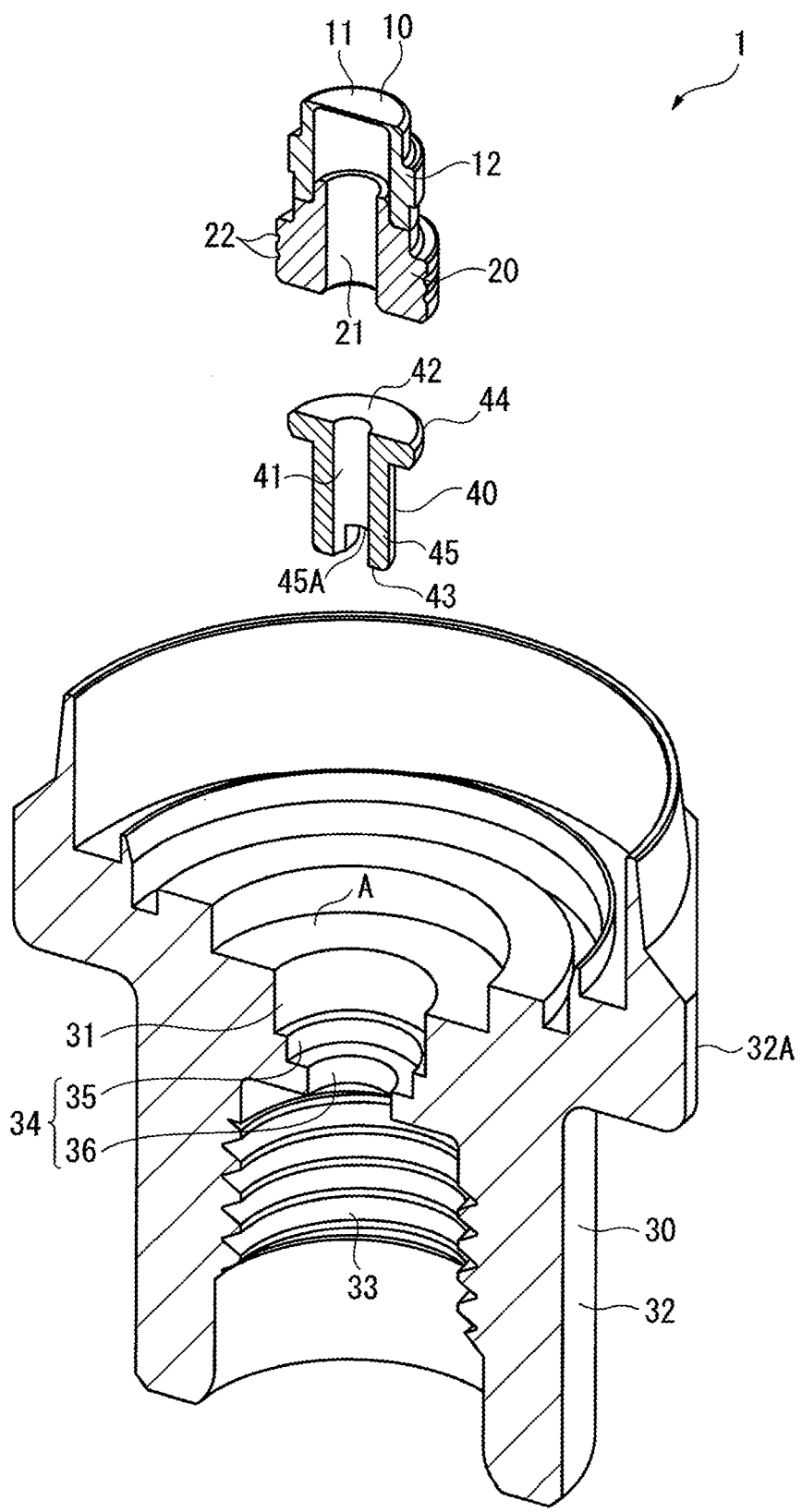
FIG. 2 is an exploded perspective view showing the pressure sensor.

As shown in FIGS. 1 and 2, a pressure sensor 1 of an exemplary embodiment is configured to measure a pressure of a fluid to be measured for an in-vehicle air conditioner, and is attachable to a connected member 2 such as a pipe-side joint provided to a pipe (not shown) where the fluid to be measured flows.

Specifically, the pressure sensor 1 includes: a pressure sensor element 10 displaceable by the pressure of the fluid to be measured introduced through the connected member 2; an adapter 20 made of metal such as stainless steel and integrally attached to the pressure sensor element 10, the adapter 20 defining therein a hole 21 through which the pressure of the fluid to be measured is introduced to the pressure sensor element 10; a fitting member 30 made of metal such as aluminum or iron and provided with a housing recess 31 for receiving the adapter 20, the fitting member 30 being connectable to the connected member 2; and an operation member 40 for pressing a valve 3 provided to the connected member 2, the operation member 40 defining a communicating path 41 through which a flow path 4 of the connected member 2, in which the pressure of the fluid to be measured is introduced, is in communication with the hole 21 of the adapter 20. The adapter 20 and the fitting member 30 are in plastic deformation connection. It should be noted that a reference numeral 5 in FIG. 1 denotes a coil spring biasing the valve 3 toward the operation member 40.

Here, the "plastic deformation connection" is connection using a technique referred to as metal flow. Specifically, the fitting member 30 bites into the adapter 20 to be airtightly attached with the adapter 20 due to a plastic deformation of an inner circumferential surface of the fitting member 30 facing the adapter 20 in a direction orthogonal to an axial direction. Further, a portion defined in a circumferential direction of the fitting member 30 is locally plastically deformed to bite into the adapter 20 with an elastic deformation pressure, and the elastic deformation pressure in the axial direction is trapped to maintain the connection of the fitting member 30 and the adapter 20 in the axial direction.

The pressure sensor element 10, which is a metal member made of, for instance, stainless steel, includes: a diaphragm 11 including a strain gauge; and a cylindrical portion 12 connected to an outer periphery of the diaphragm 11. The pressure of the fluid to be measured is introduced into the cylindrical portion 12.

The adapter 20 includes a pair of concave grooves 22 recessed radially inward from an outer circumferential surface thereof, the concave grooves 22 being spaced from each other along a communication direction of the hole 21. The concave grooves 22 are each circumferentially continuous.

An area A of the fitting member 30 around an opening of the housing recess 31 is pressed by a predetermined pressure to cause an inner circumferential surface of the housing recess 31 to be plastically deformed to bite into the concave grooves 22 of the adapter 20 (i.e., the plastic deformation connection). The adapter 20 has an end welded to an open end of the cylindrical portion 12 of the pressure sensor element 10 along the entire circumference thereof by, for instance, laser welding.

The fitting member 30 includes a cylindrical joint 32 that is to be screwed with the connected member 2. The joint 32 has an inner surface provided with a female thread 33 engageable with a male thread 6 of the connected member 2 screwed in the joint 32. An outer circumferential portion of an end of the joint 32 is provided with an operation portion 32A designed to fit in a hand tool such as a hex wrench. In the fitting member 30, an operation member fitting hole 34, in which the operation member 40 is to be fitted, is provided on a connected side facing the connected member 2 relative to the housing recess 31. The operation member fitting hole 34 is continuous with the housing recess 31.

The operation member fitting hole 34 includes: a large-diameter portion 35 for receiving a flange 44 of the operation member 40 (described later), the large-diameter portion 35 facing the housing recess 31; and a small-diameter portion 36 through which a pin body 45 of the operation member 40 (described later) penetrates, the small-diameter portion 36 being defined on the connected side facing the connected member 2 to be continuous with the large-diameter portion 35.

The operation member 40, which is made of a synthetic resin such as poly phenylene sulfide resin (PPS), includes: a contact portion 42 brought into contact with the adapter 20; a pressing portion 43 disposed opposite to the contact portion 42 to press the valve 3; the flange 44 integral and coplanar with the contact portion 42; and the pin body 45 integral with the flange 44. A distal end of the pin body 45 is defined as the pressing portion 43 for pressing the valve 3. The pin body 45 is provided with a cut hole 45A through which the communicating path 41 is in communication with the outside thereof. The operation member 40 is held between the adapter 20 and the large-diameter portion 35 of the fitting member 30.

In addition to the above components, the pressure sensor 1 also includes: an annular insulating member (e.g., a PCB or any resin member) mounted on the fitting member 30 to surround the pressure sensor element 10; an output terminal for taking out signals provided to the insulating member, the output terminal being electrically connected to the strain gauge of the pressure sensor element 10 through, for instance, wire bonding; and a cover that covers these components. It should be noted that these components are not shown in FIGS. 1 and 2.

Description will be made below on an assembly process of a main part of the pressure sensor 1 and an operation of the pressure sensor 1.

First, as shown in FIG. 2, the pressure sensor element 10 and the adapter 20 is united into a sensor module assembly in advance by fitting the pressure sensor element 10 on an end of the adapter 20, and, for instance, laser-welding the fitted portion along the entire circumference thereof. Subsequently, the operation member 40 and the sensor module assembly are inserted in this order into the fitting member 30 from a side opposite to a side connectable to the connected member 2 to be received in the operation member fitting hole 34 and in the housing recess 31, respectively.

The operation member 40 is thus fitted in the operation member fitting hole 34 to be held between the large-diameter portion 35 of the operation member fitting hole 34 and the adapter 20. The pressure sensor element 10 projects to an outside of the fitting member 30 through the housing recess 31.

Next, a predetermined pressing force is applied to the area A around the opening of the housing recess 31 using, for instance, a press machine to achieve the plastic deformation connection of the adapter 20 and the fitting member 30.

The pressure sensor element 10, the adapter 20 and the operation member 40 are thus incorporated in the fitting member 30, thereby completing the assembly process of the main part of the pressure sensor 1.

As the joint 32 is screwed with the connected member 2 to attach the pressure sensor 1 to the connected member 2, the pressing portion 43 of the operation member 40 is brought into contact with a distal end of the valve 3 to push back the valve 3 against the spring force of the coil spring 5. Consequently, the flow path 4 of the connected member 2 is opened, so that the pressure of the fluid to be measured introduced from the flow path 4 acts on the pressure sensor element 10 through the cut hole 45A of the operation member 40, the communicating path 41 and the hole 21. An electrical output corresponding to the pressure, which is generated by the strain gauge, is then outputted outside through the output terminal (not shown).

The exemplary embodiment provides the following effects (1) to (4).

(1) In the pressure sensor 1, the fitting member 30 and the adapter 20 are connected by plastic deformation to be united, thereby preventing leakage of the fluid to be measured from the connection portion.

In the above arrangement, the operation member 40 is processed in a predetermined shape by, for instance, injection molding. Since the operation member 40 is made of a synthetic resin, it can be easily processed. The operation member 40 can thus be mass-produced to reduce the production costs thereof.

(2) In the pressure sensor 1, after the operation member 40 is set in the operation member fitting hole 34, the adapter 20 is received in the housing recess 31 and connected to the fitting member 30 by plastic deformation. Thus, the operation member 40, which is disposed between the joint 32 and the adapter 20, can be easily positioned by connecting the adapter 20 and the fitting member 30. Further, since the operation member fitting hole 34 includes the large-diameter portion 35 and the small-diameter portion 36, the operation member 40 is prevented from coming out of the operation member fitting hole 34. Thus, the operation member 40 does not need to be directly bonded to the fitting member 30 by, for instance, welding, which results in facilitating the assembly process of the pressure sensor 1.

(3) In the pressure sensor 1, the pressure sensor element 10 and the adapter 20, which are united by welding, can be easily attached to the fitting member 30.

(4) Since the adapter 20 and the fitting member 30 are circumferentially continuously connected by plastic deformation, the sealability therebetween can be ensured without the necessity of providing a seal member such as an O-ring therebetween, which results in a reduction in the number of components and, consequently, in a further reduction in cost.

Incidentally, the invention is not limited to the above exemplary embodiment, but includes modifications and improvements as long as an object of the invention can be achieved.

For instance, although the pressure sensor element 10, which includes the diaphragm 11 provided with the strain gauge, is of an electric resistance type in the exemplary embodiment, a pressure sensor element according to the present invention may be of an electrostatic type that measures a pressure based on an electrostatic capacity variable with the displacement of a diaphragm, or may be a so-called micro electro mechanical system (MEMS) sensor manufactured using a microfabrication technique for semiconductors.

Although the fitting member 30 is provided with the female thread 33, and the connected member 2 is provided with the male thread 6 in the exemplary embodiment, the fitting member may be provided with a male thread, and the connected member may be provided with a female thread.

Metal materials for the fitting member and the adapter according to the invention are not limited to the materials described in the exemplary embodiment, but may be determined in view of, for instance, the compatibility between the materials for plastic deformation connection and/or a required mechanical strength.

In the exemplary embodiment, the surface of the fitting member facing the adapter along the axial direction is plastically deformed to achieve the plastic deformation connection. However, a surface of the adapter or the surfaces of both of them may be plastically deformed depending on the shapes and/or materials these components.

What is claimed is:

1. A pressure sensor comprising:
   a pressure sensor element displaceable by a pressure of a fluid to be measured introduced through a connected member;
   a metal adapter integrally attached to the pressure sensor element, the adapter defining therein a hole through which the pressure of the fluid to be measured is introduced to the pressure sensor element;
   a metal fitting member provided with a housing recess for receiving the adapter, the fitting member being connectable to the connected member; and
   an operation member for pressing a valve provided to the connected member, the operation member defining a communicating path through which a flow path of the connected member, in which the pressure of the fluid to be measured is introduced, is in communication with the hole of the adapter, the operation member being a synthetic resin member comprising:
      a contact portion brought into contact with the adapter; and
      a pressing portion provided on a side opposite to the contact portion to press the valve, wherein
   at least one of the adapter and the fitting member bites into the other one of the adapter and the fitting member to be airtightly attached with the other one of the adapter and the fitting member due to a plastic deformation of a surface of the one of the adapter and the fitting member facing the other one of the adapter and the fitting member in a direction orthogonal to an axial direction, and
   a portion defined in a circumferential direction of the one of the adapter and the fitting member is locally plastically deformed to bite into the other one of the adapter and the fitting member to maintain connection of the adapter and the fitting member in the axial direction.

2. The pressure sensor according to claim 1, wherein the operation member comprises:
   a flange brought into contact with the adapter;

a pin body integral with the flange, the pin body having a distal end defined as the pressing portion for pressing the valve, the fitting member comprises a joint that is to be screwed with the connected member, the joint is provided with an operation member fitting hole in which the operation member is to be fitted, the operation member fitting hole being continuous with the housing recess, and the operation member fitting hole comprises:

a large-diameter portion in which the flange is received; and a small-diameter portion through which the pin body penetrates, the small-diameter portion being continuous with the large-diameter portion.

3. The pressure sensor according to claim 1, wherein the pressure sensor element is a metal member comprising:

a diaphragm comprising a strain gauge; and a cylindrical portion in which the pressure of the fluid to be measured is introduced, the cylindrical portion being connected to an outer periphery of the diaphragm, the cylindrical portion having an open end welded to an end of the adapter.

* * * * *